US011981596B2

(12) United States Patent
Kladias et al.

(10) Patent No.: US 11,981,596 B2
(45) Date of Patent: May 14, 2024

(54) METHOD AND APPARATUS FOR RECLAIMING GAS IN A FIBER DRAW FURNACE

(71) Applicant: Corning Incorporated, Corning, NY (US)

(72) Inventors: Nikolaos Pantelis Kladias, Horseheads, NY (US); Yunfei Shao, Beijing (CN); Xiaoyong Wang, Shanghai (CN); Chunfeng Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/556,282

(22) Filed: Dec. 20, 2021

(65) Prior Publication Data

US 2022/0112117 A1 Apr. 14, 2022

Related U.S. Application Data

(62) Division of application No. 16/299,494, filed on Mar. 12, 2019, now Pat. No. 11,236,007.

(30) Foreign Application Priority Data

Mar. 13, 2018 (CN) ........................ 201810205268.7

(51) Int. Cl.
*C03B 37/029* (2006.01)
*C03B 37/03* (2006.01)

(52) U.S. Cl.
CPC .......... *C03B 37/029* (2013.01); *C03B 37/032* (2013.01); *C03B 2205/10* (2013.01);
(Continued)

(58) Field of Classification Search
None
See application file for complete search history.

(56) References Cited

U.S. PATENT DOCUMENTS 6,767,141 B1 7/2004 Dudek et al.
7,366,380 B1 4/2008 Peterson et al.
(Continued)

FOREIGN PATENT DOCUMENTS

CN 1341081 A 3/2002
CN 1500754 A 6/2004
(Continued)

OTHER PUBLICATIONS

JPH0940436A Clarivate Analytics Machine Translation retrieved on Dec. 15, 2022. (Year: 2022).*
(Continued)

*Primary Examiner* — Lisa L Herring
(74) *Attorney, Agent, or Firm* — Yiqun Zhao

(57) ABSTRACT

A fiber draw furnace includes a heated section configured to contain and heat a glass source from which an optical fiber is drawn. A lower extended muffle having a first end and a second end. A gas screen is coupled to the second end of the lower extended muffle configured to allow a gas to flow into the lower extended muffle. A reclaim cylinder is coupled to the lower extended muffle including an outer housing defining a reclaim chamber. A plurality of reclaim ports are tangentially coupled to the outer housing and an inner housing is positioned within the outer housing.

18 Claims, 9 Drawing Sheets

(52) U.S. Cl.
CPC ...... *C03B 2205/61* (2013.01); *C03B 2205/83* (2013.01); *C03B 2205/91* (2013.01)

(56) References Cited

U.S. PATENT DOCUMENTS

| | | | |
|---|---|---|---|
| 9,261,656 | B2 | 2/2016 | Qi et al. |
| 9,389,362 | B1 | 7/2016 | Brunschwiler et al. |
| 2014/0105612 | A1 | 4/2014 | Wu et al. |
| 2015/0037044 | A1 | 2/2015 | Peterson et al. |
| 2016/0062066 | A1 | 3/2016 | Lee et al. |
| 2016/0116695 | A1 | 4/2016 | Nekado et al. |
| 2017/0101336 | A1 | 4/2017 | Carlton et al. |
| 2019/0094460 | A1 | 3/2019 | Brusberg et al. |

FOREIGN PATENT DOCUMENTS

| | | | | | |
|---|---|---|---|---|---|
| CN | 1665749 | A | | 9/2005 | |
| CN | 104628250 | A | | 5/2015 | |
| JP | 6065747 | A | | 4/1985 | |
| JP | 09040436 | A | * | 2/1997 | ....... C03B 37/02718 |
| JP | 2003-183045 | A | | 7/2003 | |
| JP | 2004-250286 | A | | 9/2004 | |
| WO | 97/34176 | A1 | | 9/1997 | |
| WO | 2018/165002 | A1 | | 9/2018 | |
| WO | 2018/165061 | A1 | | 9/2018 | |

OTHER PUBLICATIONS

Chinese Patent Application No. 201810205268.7, Office Action, dated Apr. 20, 2022, 5 pages, Chinese Patent Office.

International Search Report and Written Opinion of the International Searching Authority; PCT/US2019/021578; dated May 21, 2019; 12 Pages; European Patent Office.

* cited by examiner

METHOD AND APPARATUS FOR RECLAIMING GAS IN A FIBER DRAW FURNACE

CROSS-REFERENCE TO RELATED APPLICATIONS

This application is a divisional of and claims the benefit of priority under 35 U.S.C. § 120 of U.S. application Ser. No. 16/299,494, filed Mar. 12, 2019, which claims the benefit of priority to Chinese Patent Application No. 201810205268.7 filed on Mar. 13, 2018, the content of which is relied upon and incorporated herein by reference in its entirety.

FIELD OF THE DISCLOSURE

The present disclosure generally relates to a fiber draw furnace, and more specifically, to a method and system for reclaiming gas in the fiber draw furnace.

BACKGROUND

Helium gas is used in various stages of conventional fiber manufacturing processes. For some manufacturing processes, a large fraction of the consumption of helium is in a fiber draw furnace where active purging of the furnace with an inert gas is required to prevent air entrainment and oxidation of the hot components of the furnace. Helium is a nonrenewable resource recovered as a byproduct from natural gas wells. As the price of helium is projected to increase in the future, and supply shortages disrupt fiber production, removing and/or reusing helium from the fiber draw furnace may be advantageous. Recycling of helium from the fiber draw furnace increases operational complexity to collect, clean, and reuse the draw furnace helium. Use of other inert gases in the fiber draw furnace, like nitrogen and argon, may be cheaper than helium but often result in unacceptable fiber diameter variation. Consequently, there is a need to provide methods and apparatuses that will allow drawing of fiber within specifications without the use of helium in the fiber draw furnace.

Graphite is widely used in muffles of fiber draw furnaces due to its high operating temperature. Graphite oxidation may take place at elevated temperatures. Oxidation of the graphite may result in grains and/or particles of graphite or carbon-containing compounds breaking free from the muffle and contacting a fiber being drawn. In addition to grains and particles traveling through the muffle, one or more gases which are destructive to the muffle may be generated. If the particles are allowed to reach a lower extended muffle, they may agglomerate into larger particles which may eventually break loose from the lower extended muffle, get reintroduced into the gas stream and contact the fiber. Accordingly, new fiber draw furnace designs which reclaim helium and remove particles may be advantageous.

SUMMARY OF THE DISCLOSURE

According to at least one feature of the present disclosure, a fiber draw furnace includes a heated section configured to contain and heat a glass source from which an optical fiber is drawn. A lower extended muffle has a first end and a second end. A gas screen is coupled to the second end of the lower extended muffle and is configured to allow a gas to flow into the lower extended muffle. A reclaim cylinder is coupled to the lower extended muffle and includes an outer housing defining a reclaim chamber. A plurality of reclaim ports are tangentially coupled to the outer housing. An inner housing is positioned within the outer housing.

According to another feature of the present disclosure, a fiber draw furnace includes a heated section configured to contain and heat a glass source from which an optical fiber is drawn. A top gas screen is coupled to a first end of the heated section and is configured to pass a first gas into the heated section. A reclaim cylinder is coupled to a second end of the heated section and includes an outer housing defining a reclaim chamber including a plurality of reclaim ports coupled thereto. The plurality of reclaim ports are substantially tangentially orientated to an exterior surface of the outer housing. An inner housing is positioned within the outer housing. The inner housing defines a barbed inlet. A lower extended muffle has a first end coupled to the reclaim cylinder. A bottom gas screen is coupled to a second end of the lower extended muffle and configured to pass a second gas into the lower extended muffle.

According to another feature of the present disclosure, a method of producing an optical fiber, includes the steps of: flowing a first gas into an optical fiber draw furnace; passing the first gas through a heated section configured to contain and heat a glass source from which the optical fiber is drawn; passing the first gas into a reclaim cylinder; removing a portion of the first gas through at least one reclaim port coupled with the reclaim cylinder such that a vortex of the first gas is generated in the reclaim cylinder; and flowing a second gas from a gas screen at a rate configured to substantially recover a pressure drop associated with removing the portion of the first gas.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
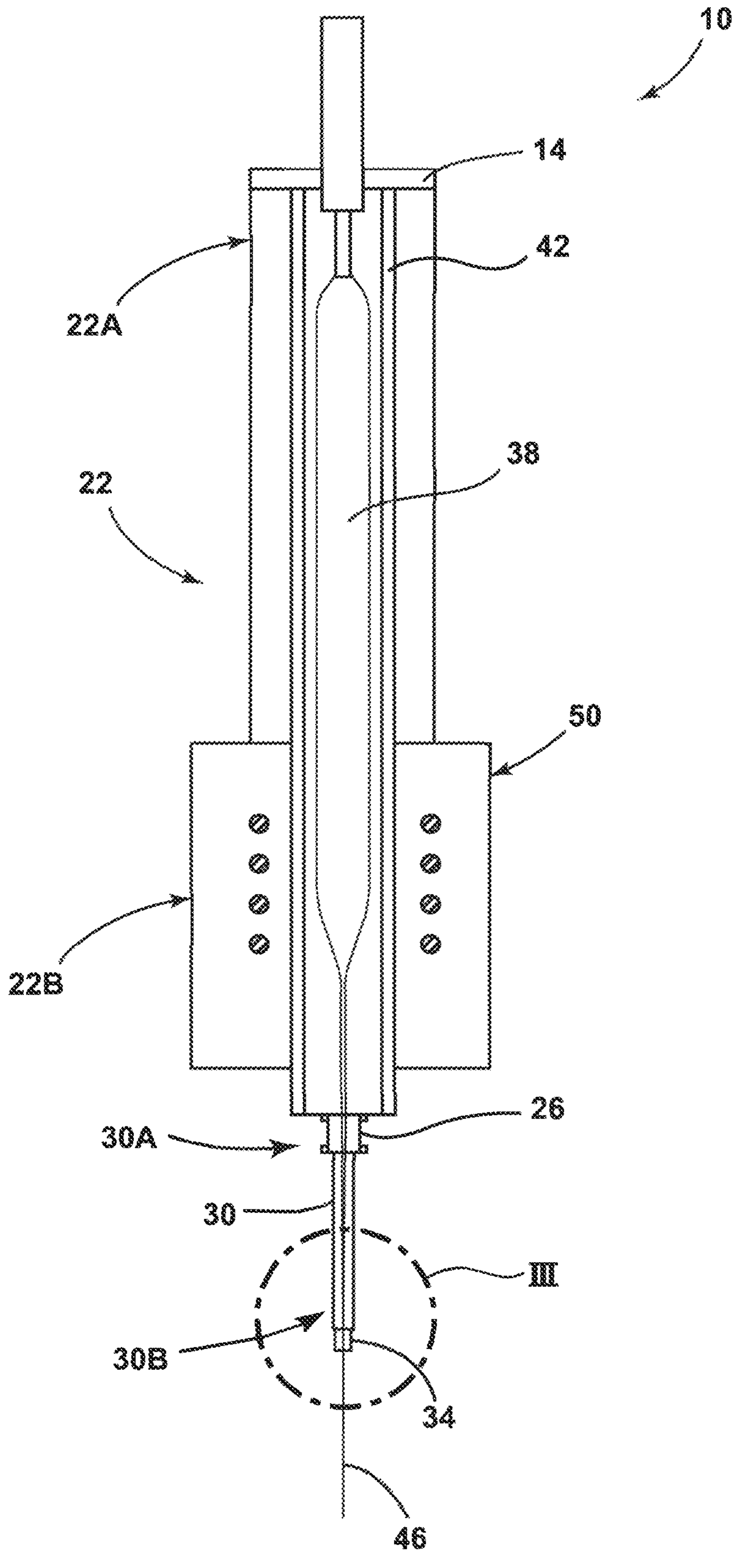
FIG. 1 is a schematic diagram of a fiber draw furnace.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring to FIG. 1, a fiber draw furnace 10 is generally shown. The fiber draw furnace 10 includes an upper gas screen 14, a heated section 22, a reclaim cylinder 26, a lower extended muffle 30, and a bottom gas screen 34. The heated section 22 may have a first end 22A and a second end 22B. The first end 22A of the heated section 22 may generally be the top and the second end 22B may generally be the bottom of the heated section 22. The lower extended muffle 30 may have a first end 30A and a second end 30B. The first end 30A of the lower extended muffle 30 may generally be the top of the lower extended muffle 30 and the second end 30B may generally be the bottom of the lower extended muffle 30. An optical fiber preform 38 and a muffle 42 are positioned within the heated section 22. The optical fiber preform 38 may be constructed of any glass or material and may be doped suitable for the manufacture of an optical fiber 46. According to various examples, the optical fiber preform 38 may include a core and a cladding. According to various examples, the optical fiber preform 38 may be heated such that the viscosity of the optical fiber preform 38 is lowered and the optical fiber 46 is drawn therefrom. The optical fiber 46 is drawn from the optical fiber preform 38 out through the reclaim cylinder 26, through the lower extended muffle 30 and out a bottom of the fiber draw furnace 10 and may be wound onto a spool.

The upper gas screen 14 is positioned within or coupled to an upper portion of the heated section 22. The upper gas screen 14 is configured to inject, release or otherwise flow a first gas into the heated section 22. The upper gas screen 14 may be a single inlet port, a plurality of inlet ports and/or a continuous or semi-continuous opening configured to inject the first gas into the heated section 22. It will be understood that the upper gas screen 14 may include one or more gratings or screens configured to modify flow characteristics of the first gas. The first gas may travel into the heated section 22, around the optical fiber preform 38 and into the reclaim cylinder 26.

The first gas may include one or more gases which are inert to the heated section 22, the optical fiber preform 38 and/or other components of the fiber draw furnace 10. For example, the first gas may include helium, argon, nitrogen, and/or other inert gases. According to various examples, the first gas includes helium. Inert examples of the first gas may be advantageous in preventing oxidation and/or damage from occurring to components of the fiber draw furnace 10. The upper gas screen 14 may inject the first gas at a rate of between about 5 standard liters per minute (SLPM) and about 100 SLPM. In specific examples, the upper gas screen 14 may inject the first gas at a flow rate of about 15 SLPM, 16 SLPM, 17 SLPM, 18 SLPM, 19 SLPM, 20 SLPM, 21 SLPM, 22 SLPM, 23 SLPM, 24 SLPM, 30 SLPM, 40 SLPM, 50 SLPM, 60 SLPM, 70 SLPM, 80 SLPM, 90 SLPM or any value or range between these values.

A heater 50 is thermally coupled to the muffle 42 of the heated section 22 and is configured to create a hot zone within the heated section 22 of the fiber draw furnace 10. Specifically, the hot zone may have a temperature of from about 1800° C. to about 2000° C. For example, the hot zone may have a temperature of about 1700° C., 1800° C., 1900° C., or about 2000° C., or any value or range between these values. The heat of the hot zone in the heated section 22 is configured to lower the viscosity of the optical fiber preform 38 such that the optical fiber 46 is drawn therefrom. The optical fiber 46 may be drawn from the optical fiber preform 38 at a rate of between about 30 m/s and about 60 m/s, or between about 40 m/s and about 50 m/s. In a specific example, the optical fiber 46 may be drawn from the fiber preform 38 at a rate of about 50 m/s.

The muffle 42 is positioned within the heated section 22 around the optical fiber preform 38. The muffle 42 and/or lower extended muffle 30 may be composed of a refractory material such as graphite, zirconia, binders and/or combinations thereof. The muffle 42 and lower extended muffle 30 may be configured to retain heat within the fiber draw furnace 10 as well as protect other components from excess temperatures. Although the materials of the muffle 42 and/or lower extended muffle 30 may generally be good insulators, oxidation may occur at elevated temperatures. As such, the first gas may be inserted or injected into the fiber draw furnace 10 to prevent oxidation of the muffle 42 and/or lower extended muffle 30. The muffle 42 and/or the lower extended muffle 30 may have a substantially uniform inner diameter, or the inner diameter may be varied throughout.

As explained above, while graphite offers superior thermal resistance properties, oxidation of graphite examples of the muffle 42 may also increase the likelihood of draw induced point defects ("DIPDs") being generated on the optical fiber 46. Oxidation occurs when gases from the ambient atmosphere (e.g., oxygen-containing compounds) and/or impurities within the first gas react with the graphite of the muffle 42 at high temperature according to equations (1) and (2):

$$C+O_2 \rightarrow CO_2 \tag{1}$$

$$C+CO_2 \rightarrow 2CO \tag{2}$$

Additionally or alternatively, silica particles (e.g., from the optical fiber preform 38) can oxidize carbon based materials based on reaction (3):

$$C+SiO_2 \rightarrow SiC+2CO \tag{3}$$

These reactions at the muffle 42 with oxygen, silicon dioxide and oxygen-containing gases may cause the muffle 42 to be consumed, especially at elevated drawing temperatures for the optical fiber 46.

In graphite examples of the muffle 42, the graphite material of the muffle 42 is a composite of graphite grains bonded together by a carbon binder matrix. The binder material is more susceptible to oxidation than the graphite grains. Therefore, when the composite of the two materials is exposed to oxygen-containing compounds at high temperatures, the matrix binder material preferentially oxidizes. The graphite grains, having no binder left to hold them in place, are then free to fall away from the muffle 42. Without being bound by theory, it is believed that this mechanism causes graphite particulates to migrate from the muffle 42 to the optical fiber 46 during drawing thereby inducing draw induced point defects (DIPDs). DIPDs manifest themselves as sharp attenuation increases in the signal transmitted through the optical fiber 46. The larger the graphite particulate, the greater the chance of the DIPD being formed on the optical fiber 46.

Without being bound by theory, it is believed that conventional furnace designs result in the collection of particles on the lower extended muffle 30. The particles agglomerate over time and grow in size. Upward moving currents of gas moving along the lower extended muffle 30 (e.g., generally moving from the second end 30B to first end 30A) may cause these agglomerated particles to break free and be carried upward. The upward motion of the agglomerated particles may allow the particles to contact the optical fiber 46 where the optical fiber 46 is still at an elevated temperature and form DIPDs. In addition to collecting and agglomerating the particles, conventional systems may promote a recirculation, or reversed flow, of gasses such as CO rather than being transported out of the fiber draw furnace 10. Such a recirculation may result in a decreased life expectancy of the muffle 42 based on equations (1), (2) and (3) listed above. In other words, the gasses which tend to deteriorate the muffle 42 may have an increased residence time within the muffle 42 due to recirculation, resulting in a decreased life expectancy of the muffle 42.

The bottom gas screen 34 may aid in preventing the loss of the first gas to an exterior of the fiber draw furnace 10 as well as the entraining of air into the furnace 10. The bottom gas screen 34 is positioned at the second end 30B, or bottom, of the lower extended muffle 30. The bottom gas screen 34 is fluidly coupled with the lower extended muffle 30 such that the bottom gas screen 34 may flow a second gas into the lower extended muffle 30. According to various examples, the bottom gas screen 34 is configured to pass the second gas at a rate configured to substantially recover a pressure drop associated with removing the portion of the first gas by the at least one reclaim port 68. As will be explained in greater detail below, the reclaim ports 68 may create a pressure drop within the fiber draw furnace 10 when gases within the reclaim cylinder 26 are drawn in. The development of the pressure drop within the fiber draw furnace 10 may be deleterious to the reclamation of gases as well as to the production of the optical fiber 46. As the pressure drops within the fiber draw furnace 10 from the removal of gases within the reclaim cylinder 26, the air in the atmosphere (e.g., nitrogen, oxygen, carbon dioxide, etc.) proximate an outlet 30C of the lower extended muffle 30 may have a tendency to be drawn into the fiber draw furnace 10 and contaminate the atmosphere within the fiber draw furnace 10 (i.e., dilute the first gas and/or introduce gases which may aid in the formation of particles). Accordingly, the bottom gas screen 34 is configured to input, inject or otherwise flow the second gas into the lower extended muffle 30 of the fiber draw furnace 10 at a flow rate, or amount, configured to recover the pressure drop in the furnace 10 associated with the removal of the first gas. The bottom gas screen 34 may introduce the second gas at a flow rate of between about 1 slpm and about 40 slpm, or between about 5 slpm and about 35 slpm, or between about 10 slpm and about 30 slpm, or between about 25 slpm and about 35 slpm, or between about 28 slpm and about 33 slpm. In some examples, the bottom gas screen 34 may introduce the second gas at a flow rate of about 8 slpm, about 9 slpm, about 10 slpm, about 11 slpm, about 12 slpm, about 29 slpm, about 30 slpm, about 31 slpm, or about 32 slpm. In other examples, the bottom gas screen 34 may introduce the second gas at a flow rate of about 0.5 slpm, about 1 slpm, about 2 slpm, about 3 slpm, about 4 slpm, about 5 slpm, about 6 slpm, or about 7 slpm. The second gas may be an inert, or largely inert, gas such as helium, neon, argon, nitrogen and/or other inert gases. Further, the second gas may be different than or have a different composition than the first gas. For example, the second gas may include helium, nitrogen, argon, other gases inert within the fiber draw furnace 10 and/or combinations thereof.

Figure 2A:
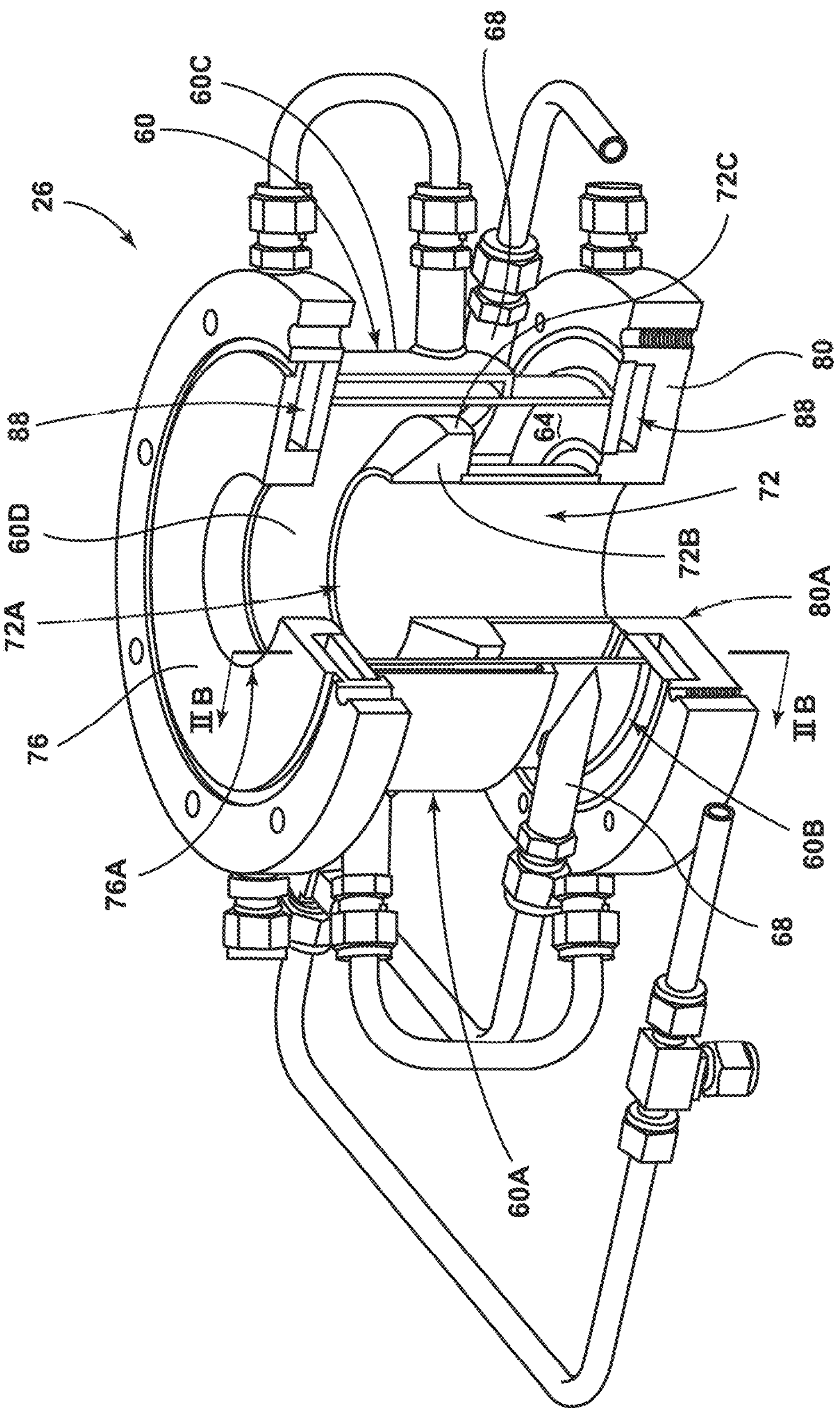
FIG. 2A is a perspective view of a reclaim cylinder, according to at least one example.
Figure 2B:
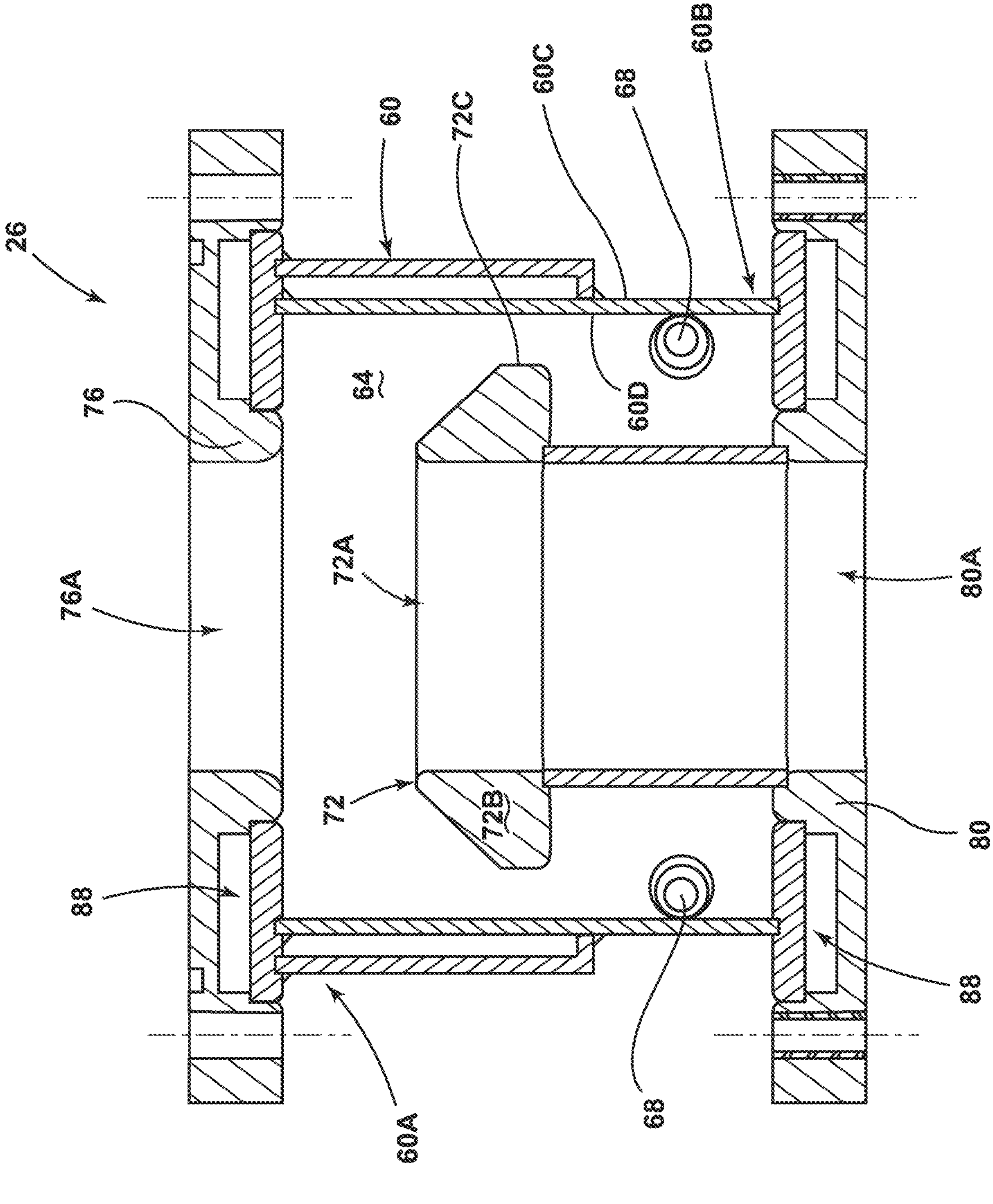
FIG. 2B is a cross-sectional view along line IIB of FIG. 2A, according to at least one example.

Referring now to FIGS. 1, 2A and 2B, the reclaim cylinder 26 is depicted as positioned between the heated section 22 and the lower extended muffle 30, but it will be understood that other positions within the fiber draw furnace 10 are contemplated. In other words, the reclaim cylinder 26 is positioned between the second end 22B of the heated section 22 and the first end 30A of the lower extended muffle 30. As such, the reclaim cylinder 26 may be coupled to the lower extended muffle 30 and the heated section 22. The reclaim cylinder 26 includes an outer housing 60 defining a reclaim chamber 64, at least one reclaim port 68, an inner housing 72, a top flange 76 and a bottom flange 80. It will be understood that the reclaim cylinder 26 may further include a variety of hoses and pipes fluidly coupled with the reclaim port(s) 68 and one or more mechanical fasteners which hold the reclaim cylinder 26 together.

The top flange 76 is positioned proximate a first end 60A of the outer housing 60 and the bottom flange 80 is positioned proximate a second end 60B of the outer housing 60. It will be understood that the first end 60A may generally be the top of the reclaim cylinder 26 and the second end 60B may generally be the bottom of the reclaim cylinder 26. As such, the top flange 76 couples the first end 60A of the outer housing 60 to the second end 22B of the heated section 22 and the bottom flange 80 couples the second end 60B of the outer housing 60 to the first end 30A of the lower extended muffle 30. According to various examples, the top and bottom flanges 76, 80 each define a fluid channel 88. The fluid channels 88 are configured to flow a cooling liquid there through. The cooling liquid in the fluid channels 88 may be water, oil and/or other fluids configured to remove heat from the top and bottom flanges 76, 80. Use of the fluid channels 88 within the top and bottom flanges 76, 80 may be advantageous in cooling O-rings which couple the top flange 76 to the heated section 22 and/or the lower flange 80 to the lower extended muffle 30. In such examples, the O-rings may provide a seal between the heated section 22 and the reclaim chamber 26 and the lower extended muffle 30 in the reclaim chamber 26. The top flange 76 defines a top aperture 76A and the bottom flange 80 defines a bottom aperture 80A. It will be understood that gases (e.g., the first and/or second gases) as well as the optical fiber 46 may move or pass through the top and bottom apertures 76A, 80A.

As explained above, the outer housing 60 includes the first end 60A and the second end 60B. The outer housing 60 also includes an exterior surface 60C and an interior surface 60D. The other housing 60 may have a height or overall length (e.g., as measured from edges of the first and second ends 60A, 60B) of from about 7 cm to about 18 cm. In specific examples, the outer housing 60 may have a length of about 12 cm, or about 12.5 cm, or about 13 cm, or about 13.5 cm, or about 14 cm, or about 14.5 cm, or about 15 cm, or about 15.5 cm, or about 16 cm, or about 16.5 cm or about 17 cm. The exterior surface 60C of the outer housing 60 may have an outside diameter of from about 10 cm to about 25 cm. The specific examples, the exterior surface 60C may have an outside diameter of about 17 cm, or about 17.5 cm, or about 18 cm, or about 18.5 cm, or about 19 cm, or about 19.5 cm, or about 20 cm, or about 205.5 cm, or about 21 cm, or about 21.5 cm or about 22 cm. According to various examples, the interior surface 60D of the outer housing 60 may have an internal diameter of from about 9.5 cm to about 24.5 cm. As such, the reclaim chamber 64 may have a diameter of from about 9.5 cm to about 24.5 cm. According to various examples, the diameter of the reclaim chamber 64 is larger than an internal diameter of the muffle 42 (i.e., the heated section 22) and/or the lower extended muffle 30. For example, a cross-sectional area of the reclaim chamber 64, as measured in a plane perpendicular to a centerline axis of the muffle 42 and/or the lower extended muffle 30, may be about 10% or greater, about 20% or greater, about 30% or greater, about 40% or greater, about 50% or greater, about 60% or greater, about 70% or greater, about 80% or greater, about 85% or greater, about 90% or greater or about 95% or greater than a cross-sectional area of the muffle 42 and/or lower extended muffle 30. It will be understood that the diameter of the reclaim chamber 64 may vary over the length of the reclaim chamber 64. Further, in some examples only an inlet area of the reclaim chamber 64, where the inlet area is a space extending between the inner housing 72 and the top flange 76, may exhibit a difference in cross-sectional area than the muffle 42. As will be explained in greater detail below, the greater cross-sectional area of the reclaim chamber 64 relative to the muffle 42 and/or lower extended muffle 30 may be advantageous in slowing the speed of the first gas as it passes from the heated section 22 into the reclaim cylinder 26. It will be understood that in examples where the second gas enters the reclaim cylinder 26, the speed of the second gas may also be slowed.

According to various examples, the reclaim port(s) 68 is coupled with the outer housing 60 of the reclaim cylinder 26. The reclaim cylinder 26 may include one reclaim port 68 or may include a plurality of reclaim ports 68. For example, if the reclaim cylinder 26 includes a plurality of reclaim ports 68, the reclaim cylinder 26 may include two, three, four, five, six, seven or greater than seven reclaim ports 68. In operation, the reclaim ports 68 function as connections for a vacuum to draw, reclaim, suck, or otherwise remove gases (e.g., the first and/or second gases) present within the reclaim chamber 64. Such a removing of gases may be generally referred to as a capture stream.

The reclaim ports 68 may be coupled to and/or integrally formed by the outer housing 60. For example, portions of the reclaim ports 68 may be defined by the outer housing 60 and other components may be coupled (e.g., mechanically) thereto. According to various examples, the plurality reclaim ports 68 are tangentially coupled or oriented to the exterior surface 60C of the outer housing 60. For purposes of this disclosure, the term "tangentially coupled" means that a centerline of the reclaim ports 68 intersect the exterior surface 60C and/or interior surface 60D of the outer housing 60 at an angle of about 45° or less. For example, the centerlines of the plurality reclaim ports 68 may form an angle with the exterior surface 60C of the outer housing at about 45° or less, or about 40° or less, or about 35° or less, or about 30° or less, or about 25° or less, or about 20° or less, or about 15° or less, or about 10° or less, or about 5° or less, or about 4° or less, or about 3° or less, or about 2° or less, or about 1° or less or about 0°. As such, the plurality reclaim ports 68 generally suck or draw gases in the reclaim chamber 64 in a radial direction. It will be understood that different reclaim ports 68 may form different angles with the exterior housing 60 than other reclaim ports 68. For example, one or more reclaim ports 68 may form a first angle (e.g., 20°) with the outer housing 60 and one or more reclaim ports 68 may form a second angle (e.g., 0°) with the outer housing 60. In examples of the reclaim cylinder 26 where a plurality of reclaim ports 68 are utilized, the reclaim ports 68 may be spread around a circumference or perimeter of the outer housing 60 and/or may be grouped. For example, the reclaim cylinder 26 may have groupings of the reclaim ports 68 positioned around the circumference or perimeter of the outer housing 60.

The reclaim ports 68 may be positioned at a variety of positions along the length of the outer housing 60. For example, one or more of the reclaim ports 68 may be positioned at a bottom, middle or top of the reclaim cylinder 26. According to various examples, the reclaim ports 68 are positioned proximate the second end 60B of the reclaim chamber 26. In other words, the reclaim ports 68 are closer to the second end 60B of the outer housing 60 than the first end 60A of the outer housing 60. In examples where the reclaim ports 68 are positioned proximate the bottom flange 80, the reclaim ports 68 may be below an inlet 72A of the inner housing 72.

The capture stream drawn in by the reclaim ports 68 may have a flow rate of from about 10 SLPM to about 40 SLPM, or from about 15 SLPM and about 35 SLPM, or from about 20 SLPM and about 30 SLPM. In some examples, the reclaim ports 68 may draw a capture stream having a flow rate of about 29 SLPM, or about 30 SLPM, or about 31 SLPM or about 32 SLPM. According to various examples, one or more of the reclaim ports 68 may be equipped with a gas purge device. Such a gas purge device may be configured to pass an inert gas in a reverse manner (e.g., toward the reclaim cylinder 26) through the reclaim ports 68 to clear any particles which may become lodged within and/or partially block the reclaim ports 68.

As the plurality reclaim ports 68 are generally tangentially coupled or oriented with respect to the outer housing 60, as the first gas is drawn into the reclaim ports 68 a vortex of the first gas is generated within the reclaim chamber 64. For purposes of this disclosure, the term "vortex" generally means that the gas within the reclaim chamber 64 has a generally circular motion and that the gas has an angular velocity. According to various examples, an axis of rotation of the vortex may be substantially parallel with an axis of the reclaim cylinder 26. In other words, the gases of the vortex may generally move in a circular path around the reclaim chamber 64 with the center of the circular path being generally along the axis of the reclaim cylinder 26. As will be understood, the direction and/or speed of the vortex of the first and second gas within the reclaim chamber 64 may be adjusted by the orientation of the reclaim ports 68 as well as the speed which the gases are drawn from the fiber draw furnace 10. As will be explained in greater detail below, the generation of the vortex of gases within the reclaim chamber 64 may aid in the collection and removal of particulate matter which may otherwise agglomerate and form larger particles in the lower extended muffle 30 and aid in the formation DIPDs. In addition, the capture stream of gases may be reclaimed, cooled and/or purified for later reuse within the fiber draw furnace 10.

The inner housing 72 is positioned within the reclaim chamber 64 of the outer housing 60. The inner housing 72 may be coupled with the bottom flange 80 or may be integrally defined by the bottom flange 80. According to various examples, the inner housing 72 is substantially coaxial with the outer housing 60. As such, an axis of the rotation of the vortex may be generally parallel with an axis of the inner housing 60. Further, the inner housing 72 may be substantially coaxial with the lower extended muffle 30. The inner housing 72 extends from the bottom flange 80 in a generally upward direction toward the top flange 76. The inner housing 72 may have a substantially circular cross-section, but it will be understood that the inner housing 72 may have a square, rectangular, or higher order polygon cross-section. The inner housing 72 may have an internal diameter of from about 4 cm to about 8 cm. For example, the internal diameter of the inner housing 72 may be about 4.5 cm, or about 5.0 cm, or about 5.5 cm, or about 6.0 cm, or about 6.3 cm, or about 6.5 cm, or about 7.0 cm or about 7.5 cm. The internal diameter of the inner housing 72 may be substantially the same as the internal diameter of the lower extended muffle 30. According to various examples, the inner housing 72 may define a barbed inlet 72B. For example, the barbed inlet 72B may be tapered in an upward direction or toward the inlet 72A of the inner housing 72. The barbed inlet 72B may be tapered at an angle $\alpha$ of from between about 1° and about 60°. For example $\alpha$ may be about 5°, or about 10°, or about 15°, or about 20°, or about 25°, or about 30°, or about 35°, or about 40°, or about 45°, or about 50°, or about 55° or about 60°. The barbed inlet 72B provides an edge 72C which extends toward the outer housing 60. It will be understood that the barbed inlet 72B may also be referred to as a flange or a tapered flange. Use of the barbed inlet 72B may be advantageous in controlling the flow direction of the first gas when it enters the reclaim chamber 64. For example, the shape or angle $\alpha$ of the barbed inlet 72B directs the first gas toward the plurality of reclaim ports 68. Use of the barbed inlet 72B in conjunction with the plurality of reclaim ports 68 provides a relatively low-pressure area to be formed at the bottom of the reclaim chamber 64 proximate the bottom flange 80 such that the first gas flows towards the plurality reclaim ports 68.

In operation, the fiber draw furnace 10 may allow for both the reclamation of the first gas while also removing particulates generated within the heated section 22. Further, as the second gas may flow from the lower extended muffle 30 into the reclaim cylinder 26, a portion of the second gas may be removed and/or reclaimed. Even further, not all of the first gas may be removed by the one or more reclaim ports 68 such that a portion of the first gas may pass from the reclaim cylinder 26 into the lower extended muffle 30. For example, as the first and second gases pass from the respective heated section 22 and lower extended muffle 30 into the reclaim cylinder 26, the larger volume of the reclaim chamber 64 relative to the size of the heated section 22 and the lower extended muffle 30 causes the speed of the first and second gases to slow in velocity. For example, the velocity of the first and/or second gases may decrease by about 5% or greater, about 10% or greater, about 15% or greater, about 20% or greater, about 25% or greater, about 30% or greater, about 35% or greater, about 40% or greater, about 44% or greater, about 45% or greater, or about 50% or greater, or about 55% or greater or about 60% or greater.

As explained above, due to the inertia of larger size particles, the larger particles generated within the heated section 22 may continue through the inner housing 72 and into the lower extended muffle 30. In other words, the larger particles may follow the path of the optical fiber 46 through the reclaim cylinder 26 and through the lower extended muffle 30. Conversely, the smaller particles, having less inertia, are more subject to the flow of the first and/or second gases. As such, the smaller particles may be captured within the vortex of gases created by the tangential coupling of the plurality of reclaim ports 68 to the outer housing 60. With the smaller particles entrained within the vortex, the reclaim ports 68 may then remove the particles from the fiber draw furnace 10 along with the first and/or second gases.

As the reclaim cylinder 26 is located closer to the upper gas screen 14, the concentration, or volume fraction, of the first gas may be greater than the concentration of the second gas within the capture stream drawn off by the reclaim ports 68. For example, the volume fraction (i.e., provided as a percentage) of the first gas within the capture stream may be greater than about 70%, or greater than about 75%, or greater than about 80%, or greater than about 85%, or greater than about 90%, or greater than about 95% or greater than about 99%. The reclaim ports 68 may draw the capture stream at a rate such that the mixed gases are captured at a rate greater than about 50% of the combined first and second gas flow rates. For example, the flow rate of the capture stream from the reclaim ports 68 may be about 50% or greater, or about 55% or greater, or about 60% or greater, or about 65% or greater, or about 70% or greater, or about 75% or greater, or about 80% or greater, or about 85% or greater, or about 90% or greater, or about 95% or greater or about 99% or greater of the combined first gas and second gas flow rates.

Figure 3:
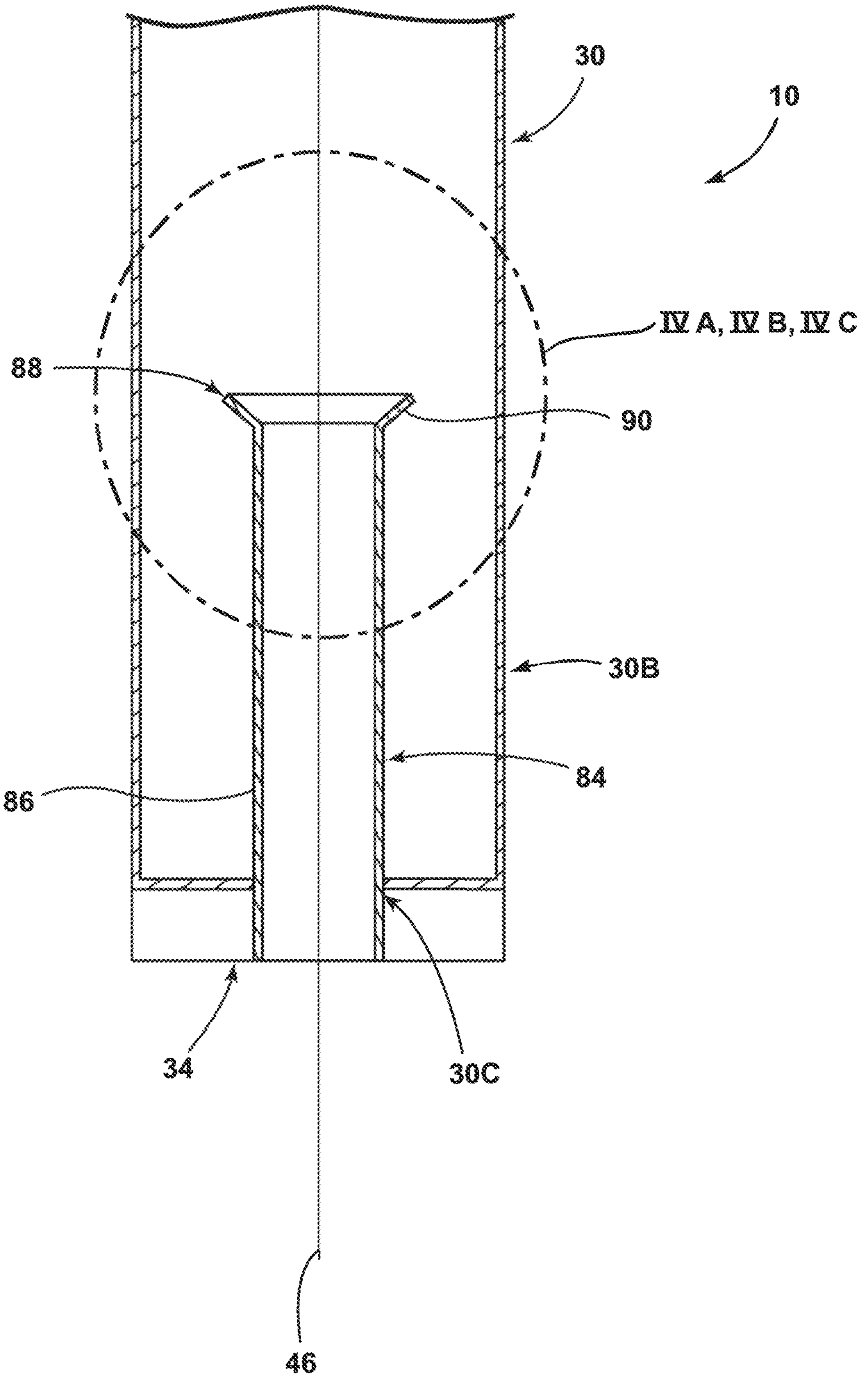
FIG. 3 is an enhanced view taken at section III of FIG. 1, according to at least one example.
Figure 4A:
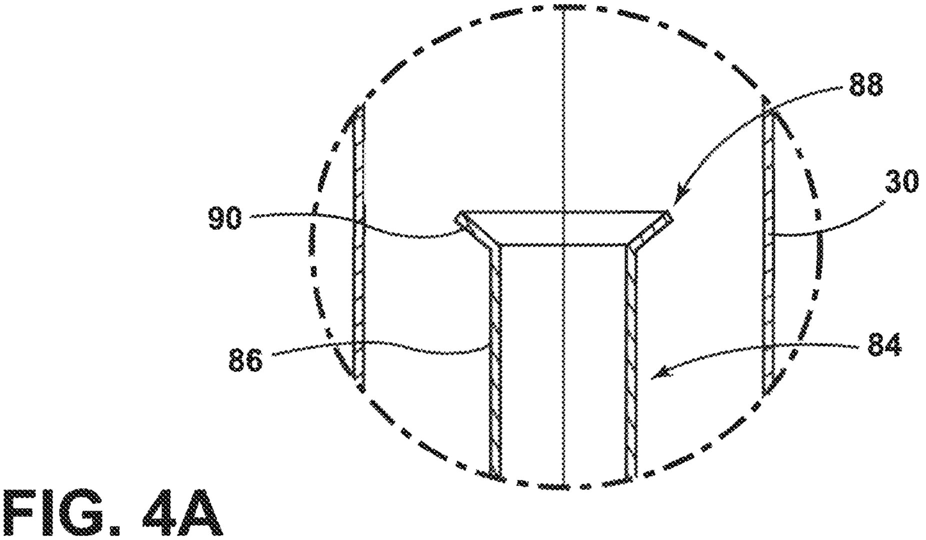
FIG. 4A is an enhanced view taken at section IVA of FIG. 3.
Figure 4B:
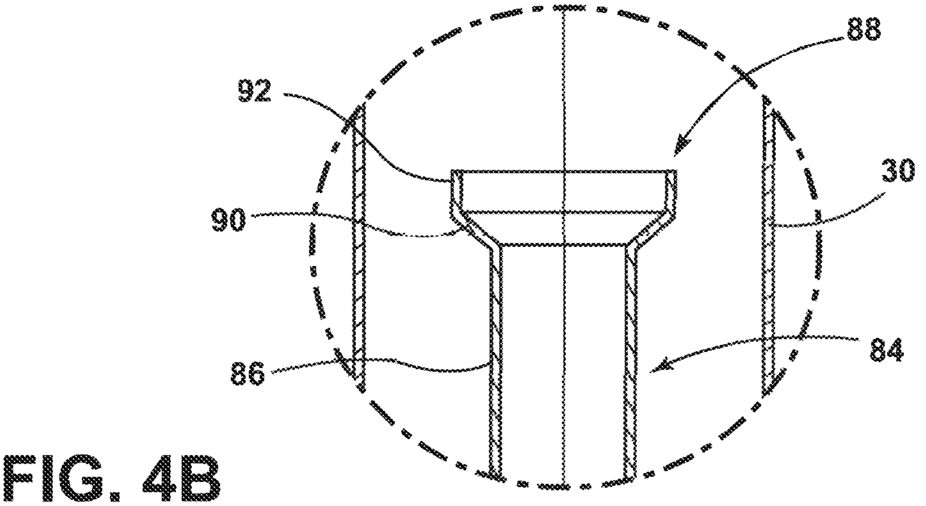
FIG. 4B is an enhanced view taken at section IVB of FIG. 3.
Figure 4C:
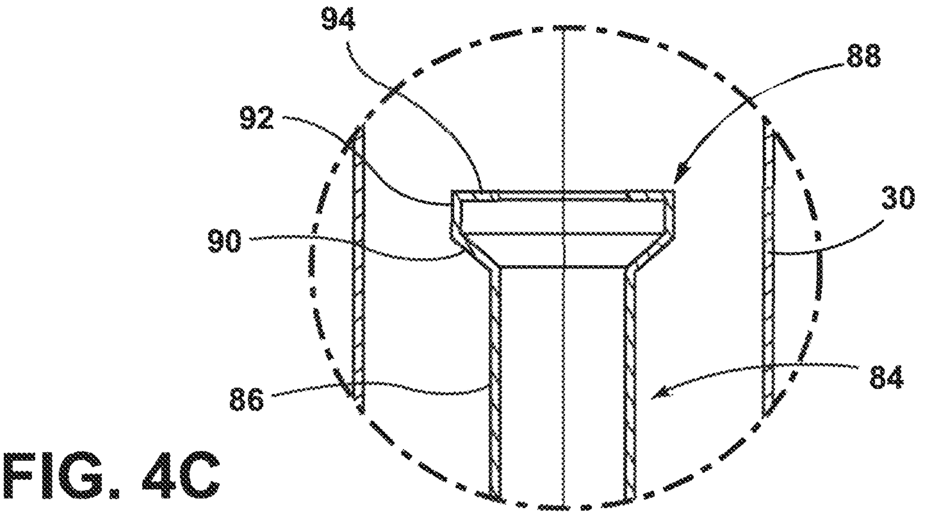
FIG. 4C is an enhanced view taken at section IVC of FIG. 3.

Referring now to FIGS. 3-4C, the lower extended muffle 30 is shown including an adapter tube 84. It will be understood that use of the adapter tube 84 may be optional and that not all of the examples provided herein may include the adapter tube 84. The adapter tube 84 may be coupled to the outlet 30C of the lower extended muffle 30 and/or may be coupled to the bottom gas screen 34. In operation, the optical fiber 46 is drawn through reclaim cylinder 26, into the lower extended muffle 30, through the adapter tube 84 and out of the fiber draw furnace 10 through the bottom gas screen 34. The adapter tube 84 extends in an upward direction from the second end 30B toward the first end 30A of the lower extended muffle 30. The adapter tube 84 includes a body 86 and an entrance 88. The body 86 may be substantially coaxial with the lower extended muffle 30 and/or the reclaim cylinder 26. The body 86 of the adapter tube 84 may have an inside diameter of from about 0.25 in (0.635 cm) to about 2.0 in (5.08 cm), or from about 0.5 in (1.27 cm) to about 1.0 in (2.54 cm). In specific examples, the inside diameter of the adapter tube 84 may be about 0.5 in (1.27 cm), about 0.75 in (1.905 cm), about 1.0 in (2.54 cm), or about 1.25 in (3.175 cm). The adapter tube 84 may have a length of from about 1 in (2.54 cm) to about 10 in (25.4 cm), or from about 2 in (5.08 cm) to about 7 in (17.78 cm). In specific examples, the adapter tube 84 may have a length of about 3 in (7.62 cm), about 4 in (10.16 cm), about 5 in (12.7 cm) or about 6 in (15.24 cm).

Alteration of the entrance 88 of the adapter tube 84 may decrease or mitigate the number and/or frequency of DIPDSs. FIGS. 4A-C provide various examples of the entrance 88 of the adapter tube 84. The entrance 88 of the adapter tube 84 may take a variety of configurations. In various examples, the entrance 88 may include a conical portion 90. The conical portion 90 may be inverted such that the entrance 88 of the adapter tube 84 tapers as it approaches the body 86. Use of the conical portion 90 may be advantageous in reducing the DIPDs by reducing a magnitude of a radial component of the first and/or second gas velocity vector and therefore reduces flow of the first or second gases toward the muffle 42 (FIG. 1) of the heated section 22 thereby reducing particles entering the lower extended muffle 30 and being recirculated. In a first example (FIG. 4A), the entrance 88 may simply include the conical portion 90 tapering toward the body 86 of the adapter tube 84. In a second example (FIG. 4B), the entrance 88 may incorporate a first flange 92 which is substantially coaxial with the adapter tube 84. The first flange 92 may be placed on top of the conical portion 90 such that the entrance 88 tapers from the first flange 92 to the body 86. In a third example (FIG. 4C), a second flange 94 may be positioned on top of the first flange 92, the second flange 94 being perpendicular to the body 86 of the adapter tube 84 and the first flange 92. The second flange 96 may extend inward and/or outward from the adapter tube 84. Use of the examples depicted in FIGS. 4A-C may decrease the DIPDs per kilometer of produced optical fiber 46 from about 5% in examples with no entrance 88 (e.g., just the body 86 of the adapter tube 84) to less than about 1.5% in examples using at least the conical portion 90.

Figure 5:
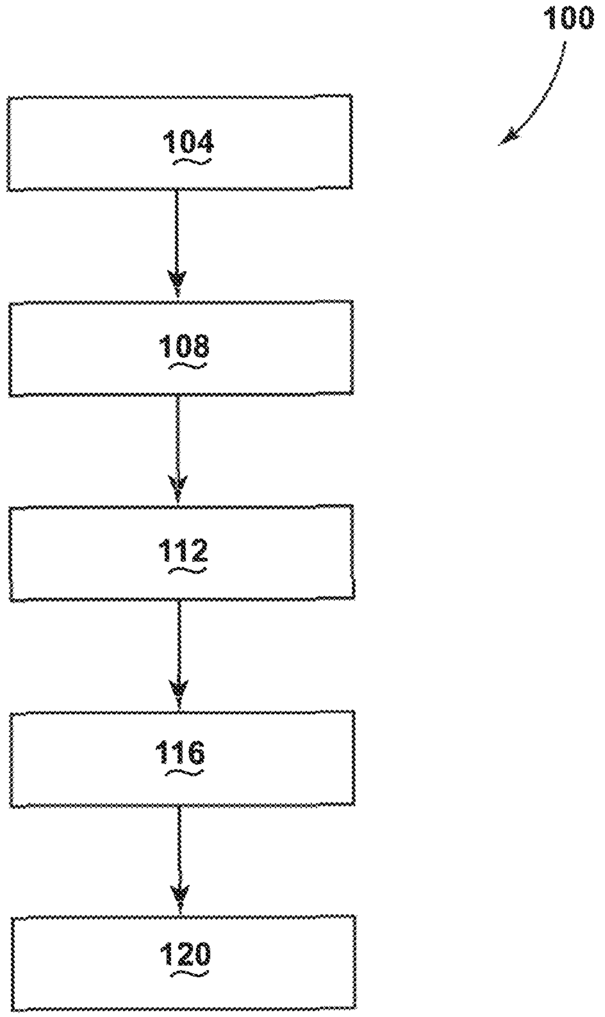
FIG. 5 is a flowchart of an exemplary method, according to at least one example.

Referring now to FIG. 5, depicted is an exemplary method 100 of producing the optical fiber 46. The method 100 may begin with step 104 of flowing the first gas into the optical fiber draw furnace 10. As explained above, the first gas may be flown into the fiber draw furnace 10 through the upper gas screen 14. As the first gas may be a gas which is inert to the muffle 42, optical fiber preform 38 and/or other components of the fiber draw furnace 10, step 104 may further include flowing helium into the optical fiber draw furnace 10. It will be understood that any of the above noted first gases may additionally or alternatively flown into the fiber draw furnace 10.

Next, a step 108 of passing the first gas through the heated section 22 configured to contain and heat a glass source from which the optical fiber 46 is drawn is performed. The glass source may be the optical fiber preform 38 or other glass sources which may be utilized in the fiber draw furnace 10. As explained above, the high temperatures of the heated section 22 may result in the formation of particles which are entrained within the first gas as it passes through the heated section 22 and/or proximate the muffle 42.

Next, a step 112 of passing the first gas into the reclaim cylinder 26 is performed. As explained above, the reclaim cylinder 26 may be coupled to the heated section 22 through the top flange 76. It will be understood that one or more sections of pipe or tubing may be positioned between the reclaim cylinder 26 and the heated section 22 without departing from the teachings provided herein. The first gas is passed into the reclaim chamber 64 defined by the outer housing 60 of the reclaim cylinder 26. As explained above, as the reclaim chamber 64 has a greater diameter than the heated section 22, the velocity of the first gas may be slowed relative to the gas velocity of the first gas in the heated section 22.

Next, a step 116 of removing a portion of the first gas through at least one reclaim port 68 coupled with the reclaim cylinder 26 such that a vortex of the first gas is generated in the reclaim cylinder 26 is performed. The one or more reclaim ports 68 are tangentially oriented or coupled to the outer housing 60 of the reclaim cylinder 26 such that gases within the reclaim chamber 64 obtain an angular momentum. In other words, the vortex is generated within the reclaim chamber 64. As explained above, by removing the portion of the first gas through the tangentially oriented at least one reclaim port 68, the axis of rotation of the vortex is parallel with an axis of the reclaim cylinder 26. As the reclaim cylinder 26, the lower extended muffle 30 and the heated section 22 are all aligned, the axis of rotation of the vortex may be parallel with an axis of the lower extended muffle 30 and/or the heated section 22. According to various examples, a portion of the second gas may flow upward through the lower extended muffle 30 and into the reclaim chamber 64 of the reclaim cylinder 26 such that both the first and second gases form the vortex. As such, the one or more reclaim ports 68 may reclaim or remove a mixture of the first gas and second gas. The first and second gases may be reclaimed at a rate of from about 80% to about 95% of the combined first and second gas flow rate and the first gas volume fraction in the mixture gas is about 80% or greater. It will be understood that a portion of the first gas may not be captured by the reclaim ports 68 such that the reclaim cylinder 26 may pass a portion of the first gas from the reclaim cylinder 26 into the lower extended muffle 30.

Next, a step 120 of flowing the second gas from a gas screen (e.g., the bottom gas screen 34) at a rate configured to substantially recover a pressure drop associated with removing the portion of the first gas may be performed. As explained above, removal of the first and/or second gases by the reclaim ports 68 may result in a pressure drop occurring within the fiber draw furnace 10 which may result in the entraining of ambient air within the fiber draw furnace 10. Step 120 may include flowing a gas which is inert to the optical fiber from the bottom gas screen 34.

It will be understood that although the steps of the method 100 are described in a sequential order, one or more of the steps may be performed at the same time. For example, all of the steps may be performed simultaneously. Further, it will be understood that the order of the steps of the method 100 may be changed without departing from the teachings provided herein.

Use of the present disclosure may offer a variety of advantages. First, by positioning the reclaim cylinder 26 between the heated section 22 and the lower extended muffle 30, a higher purity of the first gas may be reclaimed through the reclaim ports 68. In other words, the capture stream pulled through the reclaim ports 68 may have a larger volume fraction of the first gas than the second gas. Such a feature may be advantageous in decreasing costs associated with the use of helium as the reclaim cylinder 26 of the present disclosure may allow for a greater efficiency of capture as compared to conventional fiber draw furnaces. Second, by tangentially coupling or orienting the reclaim ports 68 relative to the outer housing 60 of the reclaim cylinder 26, gases present within the reclaim chamber 64 may obtain an angular momentum resulting in the formation of a vortex within the reclaim cylinder 26. As explained above, the formation of the vortex is advantageous in capturing relatively small particles which may otherwise agglomerate on walls of the lower extended muffle 30 and form DIPDS on the optical fiber 46. As such a greater usable length of optical fiber 46 may be produced from the presently disclosed fiber draw furnace 10 which results in decreased costs associated with the production of unusable lengths of optical fiber 46.

Examples

Figure 6B:
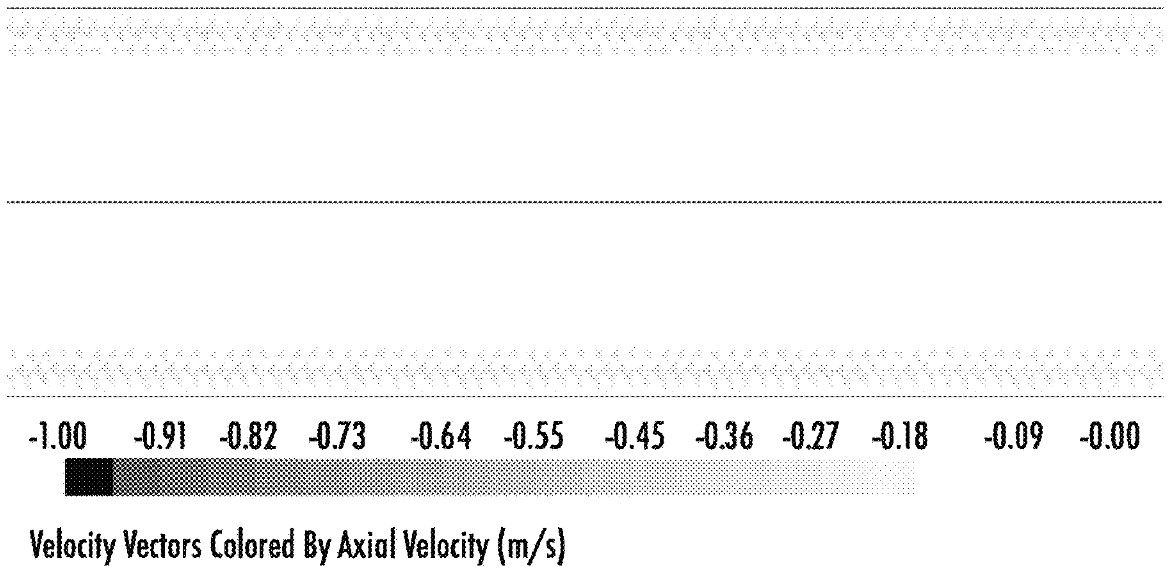
FIG. 6B is an enhanced view of section VIB of FIG. 6A.
Figure 6A:
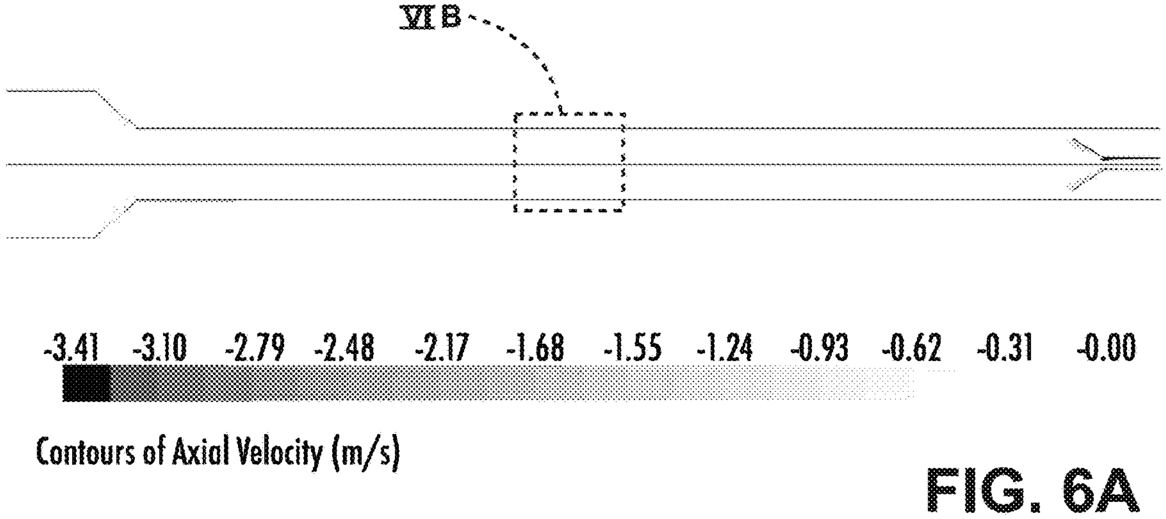
FIG. 6A is a gas flow diagram, according to a first comparative example.

Referring now to FIGS. 6A and 6B, depicted is a gas flow simulation of a lower muffle (e.g., the lower extended muffle 30) illustrating a reverse flow of gas which occurs within the lower muffle. As explained above, reversed flow of gas through lower muffles tends to cause agglomerated particulates to break free and contact hot portions of a fiber optic (e.g., the optical fiber 46) which may result in a draw induced point defect.

Figure 7:
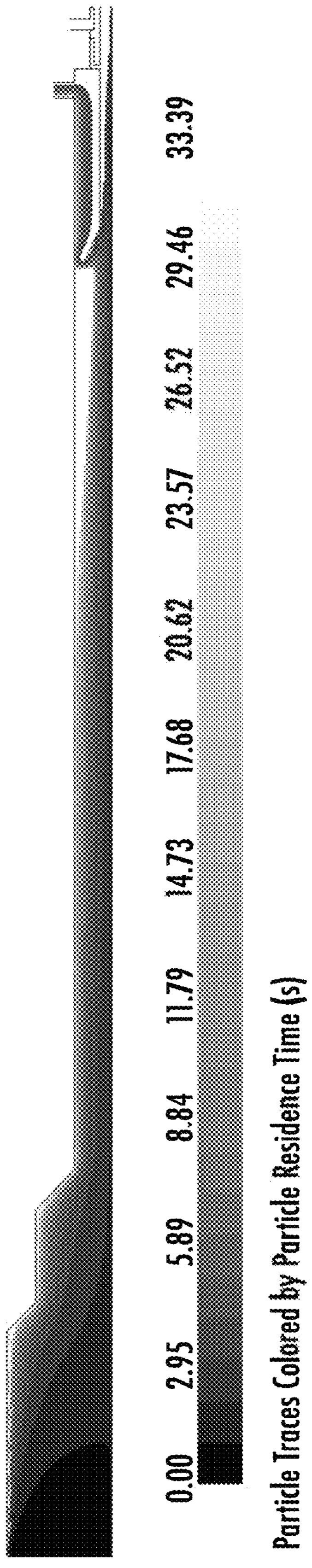
FIG. 7 is a particle flow simulation of the first comparative example.

Referring now to FIG. 7, depicted is a particle trace model plot showing the residence time of particles within an optical fiber draw system (e.g., the fiber draw furnace 10). As can be seen, by drawing particles toward a bottom of the system, the residence time of the particles within the system grows. By removing particles at a base of the system, far from where they are produced, the residence time of the particles is increased. As explained above, increasing residence time of the particles within the system may allow for the collection and agglomeration of the particles. With increasing agglomeration, the DIPD incidents increase for fiber optics produced from the system.

Figure 8A:
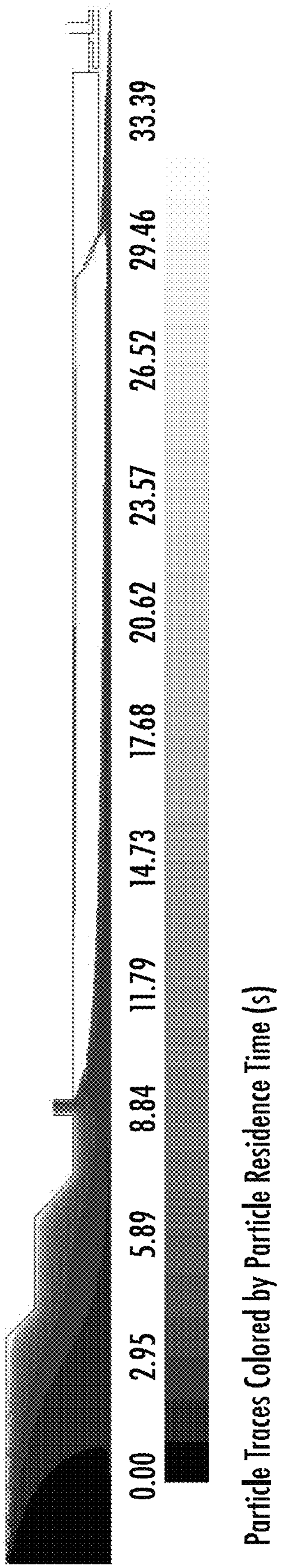
FIG. 8A is a particle flow simulation of a first example of the present disclosure.
Figure 8B:
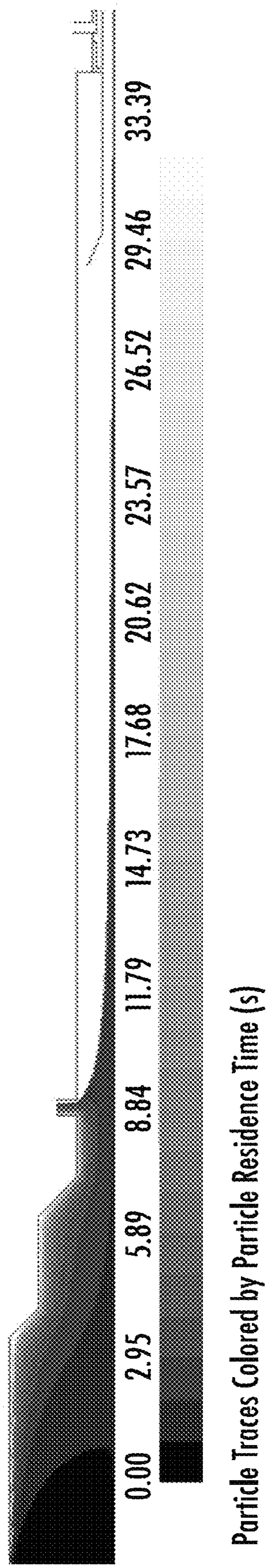
FIG. 8B is a particle flow simulation of a second example of the present disclosure.

Referring now to FIGS. 8A and 8B, depicted are particle trace model plots showing the residence time of particles within an optical fiber draw system where the particles are removed proximate to where they are produced. In the model, the particles are 0.1 μm SiC particle which are tracked by a Discrete Phase Model (DPM). As can be seen, collection of the particles proximate to the formation point may decrease the number of particles contacting the lower muffle. The decrease in the number of particles reaching the lower muffle is advantageous in preventing the sticking and agglomeration of particles which may break off and manifest as draw induced point defects in the fiber optic. In the model of FIG. 8A, 80% of gas supplied from a top gas screen (e.g., the upper gas screen 14) is captured in a reclaim stream through removal ports (e.g., the reclaim ports 68). In the model of FIG. 8B, 89% of gas supplied from a top gas screen is captured in a reclaim stream through removal ports. When the removal ports are located at the top of the lower muffle, particles are not trapped on the lower muffle wall because they are captured before they can even reach the lower muffle.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below.

What is claimed is:

1. A method of producing an optical fiber, comprising the steps of:
- flowing a first gas into an optical fiber draw furnace;
- passing the first gas through a heated section configured to contain and heat a glass source from which the optical fiber is drawn;
- passing the first gas into a reclaim cylinder;
- removing a portion of the first gas through at least one reclaim port coupled with the reclaim cylinder, wherein the at least one reclaim port is tangentially oriented to an exterior surface of a housing of the reclaim cylinder such that a vortex of the first gas is generated in the reclaim cylinder; and
- flowing a second gas from a gas screen at a rate configured to substantially recover a pressure drop associated with removing the portion of the first gas.

2. The method of claim 1, wherein the step of removing the portion of the first gas comprises:
- removing a mixture of the first gas and the second gas through the at least one reclaim port at a rate of from about 80% to about 95% of a combined first and second gas flow rate and the first gas volume fraction in the mixture gas is about 80% or greater.

3. The method of claim 1, further comprising the step:
- passing a portion of the first gas from the reclaim cylinder into an upper portion of a lower extended muffle.

4. The method of claim 1, wherein the step of removing the portion of first gas comprises:
- removing the portion of the first gas such that an axis of rotation of the vortex is parallel with an axis of the reclaim cylinder.

5. The method of claim 1, wherein the step of flowing a first gas into an optical fiber draw furnace comprises:
- flowing the first gas comprising helium into the optical fiber draw furnace.

6. The method of claim 1, wherein the step of flowing the second gas from the gas screen comprises:
- flowing the second gas comprising a gas which is inert to the optical fiber from the gas screen.

7. The method of claim 1, wherein passing the first gas into the reclaim cylinder comprises passing the first gas from the heated section into the reclaim cylinder, wherein the speed of the first gas reduces as the first gas passes from the heated section into the reclaim cylinder.

8. A method of producing an optical fiber, comprising:
- flowing a first gas into an optical fiber draw furnace;
- passing the first gas through a heated section configured to contain and heat a glass source from which the optical fiber is drawn;
- passing the first gas into a reclaim cylinder, wherein the speed of the first gas reduces as the first gas is passed into the reclaim cylinder; and
- removing a portion of the first gas through at least one reclaim port coupled with the reclaim cylinder such that a vortex of the first gas is generated in the reclaim cylinder.

9. The method of claim 8, further comprising flowing a second gas at a rate configured to substantially recover a pressure drop associated with removing the portion of the first gas.

10. The method of claim 8, wherein the at least one reclaim port is tangentially oriented to an exterior surface of the reclaim cylinder.

11. The method of claim 8, further comprising passing a portion of the first gas from the reclaim cylinder into a lower extended muffle.

12. The method of claim 11, wherein the portion of the first gas is passed from the reclaim cylinder into an upper portion of the lower extended muffle.

13. A method of producing an optical fiber, comprising the steps of:
- flowing a first gas into an optical fiber draw furnace;
- passing the first gas through a heated section configured to contain and heat a glass source from which the optical fiber is drawn;
- passing the first gas into a reclaim cylinder;
- removing a portion of the first gas through at least one reclaim port coupled with the reclaim cylinder, wherein the at least one reclaim port is tangentially oriented to an exterior surface of the reclaim cylinder for generating a vortex of the first gas in the reclaim cylinder.

14. The method of claim 13, further comprising passing a portion of the first gas from the reclaim cylinder into an upper portion of a lower extended muffle.

15. The method of claim 13, wherein the speed of the first gas reduces as the first gas is passed into the reclaim cylinder.

16. The method of claim 13, further comprising flowing a second gas at a rate configured to substantially recover a pressure drop associated with removing the portion of the first gas.

17. The method of claim 16, wherein the step of removing the portion of the first gas comprises:
- removing a mixture of the first gas and the second gas through the at least one reclaim port at a rate of from about 80% to about 95% of a combined first and second gas flow rate and the first gas volume fraction in the mixture gas is about 80% or greater.

18. The method of claim 13, further comprising passing a second gas into the reclaim cylinder, wherein the speed of the second gas reduces as the second gas is passed into the reclaim cylinder.

* * * * *